US012614459B2

(12) United States Patent
Huo et al.

(10) Patent No.: US 12,614,459 B2

(45) Date of Patent: Apr. 28, 2026

(54) SCOPE MANAGER FOR ADVANCED DRIVER ASSISTANCE SYSTEMS

(71) Applicant: Toyota Jidosha Kabushiki Kaisha, Toyota (JP)

(72) Inventors: Zhaoyuan Huo, Cupertino, CA (US); Stephanie Lefevre, Mountain View, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 92 days.

(21) Appl. No.: 18/428,509

(22) Filed: Jan. 31, 2024

(65) Prior Publication Data

US 2025/0246075 A1 Jul. 31, 2025

(51) Int. Cl.
| | |
|---|---|
| B60Q 1/00 | (2006.01) |
| G08G 1/16 | (2006.01) |
| B60W 30/08 | (2012.01) |
| B60W 50/10 | (2012.01) |
| B60W 50/14 | (2020.01) |
| B60W 50/16 | (2020.01) |

(52) U.S. Cl.
CPC ............... G08G 1/16 (2013.01); B60W 30/08 (2013.01); B60W 50/10 (2013.01); B60W 2050/143 (2013.01); B60W 2050/146 (2013.01); B60W 50/16 (2013.01)

(58) Field of Classification Search
CPC ........ G08G 1/16; B60W 30/08; B60W 50/10; B60W 50/16; B60W 2050/143; B60W 2050/146
See application file for complete search history.

(56) References Cited

U.S. PATENT DOCUMENTS

| | | | |
|---|---|---|---|
| 2018/0322783 A1 | 11/2018 | Toyoda et al. | |
| 2019/0113927 A1 | 4/2019 | England et al. | |
| 2019/0163176 A1 | 5/2019 | Wang et al. | |
| 2020/0339157 A1* | 10/2020 | Yurdana ................ | B60K 35/70 |
| 2023/0025222 A1 | 1/2023 | Zhang et al. | |

(Continued)

FOREIGN PATENT DOCUMENTS

| | | |
|---|---|---|
| CN | 113859258 A | 12/2021 |
| WO | 2021119964 A1 | 6/2021 |

OTHER PUBLICATIONS

Autonomous Driving Architectures, Perception and Data Fusion: A Review (https://www.semanticscholar.org/paper/Autonomous-Driving-Architectures%2C-Perception-and-A-Velasco-Hern%C3%A1ndez-Yeong/34c6f8b20aa971af96d14c6694196b791e5cfd59) Sep. 3, 2020.

*Primary Examiner* — Toan N Pham

(74) *Attorney, Agent, or Firm* — DINSMORE & SHOHL LLP

(57) ABSTRACT

A vehicle system of a vehicle may include one or more processors that receive first data indicating a driving environment of the vehicle, determine a risk factor indicating a riskiness of a driving situation of the vehicle based on the first data, when the risk factor is between a first threshold value and a second threshold value, output information to a driver of the vehicle, when the risk factor is between the second threshold value and the third threshold value, output a warning to the driver of the vehicle, and when the risk factor is above the third threshold value, cause the vehicle to perform a driving action that reduces the riskiness of the driving situation.

18 Claims, 5 Drawing Sheets

(56) References Cited

U.S. PATENT DOCUMENTS

| | | | | |
|---|---|---|---|---|
| 2023/0234579 A1* | 7/2023 | Ugajin | ............. | B60W 30/0956 |
| 2023/0347876 A1* | 11/2023 | Quint | .................... | B60W 30/14 |
| 2024/0270285 A1* | 8/2024 | Ucar | ................ | B60W 30/0956 |
| 2025/0065926 A1* | 2/2025 | Liu | ................... | B60W 60/0015 |
| 2025/0171027 A1* | 5/2025 | Tariq | .................... | B60W 30/09 |

* cited by examiner

306

400 SENSOR DATA RECEPTION MODULE

402 RISK FACTOR DETERMINATION MODULE

404 SCOPE DETERMINATION MODULE

406 OPTIMIZATION PROBLEM FORMULATION MODULE

408 OPTIMIZATION PROBLEM SOLVING MODULE

410 LIGHTWEIGHT PROBLEM SOLVING MODULE

412 OUTPUT MODULE

414 FEEDBACK RECEPTION MODULE

416 PATH PLANNING MODULE

418 VEHICLE CONTROL MODULE

RECEIVE SENSOR DATA ⌐500

DETERMINE RISK FACTOR ⌐502

TAKE PREVENTATIVE ACTION ⌐504

SCOPE MANAGER FOR ADVANCED DRIVER ASSISTANCE SYSTEMS

TECHNICAL FIELD

The present specification relates to driver assistance systems, and more particularly, to a scope manager for advanced driver assistance systems.

BACKGROUND

An advanced driver assistance system architecture typically comprises three main components: a perception module (e.g., a module that receives inputs from external sensors) that perceives the environment around a vehicle, a planning module that calculates a trajectory for the vehicle based on the perceived environment, and a control module that outputs signals to control the driving of the vehicle based on the calculated trajectory. However, these components typically perform the same operations on their inputs and do not consistently adjust their behavior based on a riskiness of a driving situation or driver feedback. Accordingly, a need exists for a scope manager for advanced driver assistance systems that adjusts a problem formulation for downstream modules based on risk factors, making advanced driver assistance system outputs more context-aware.

SUMMARY

In an embodiment, a vehicle system of a vehicle may include one or more processors that receive first data indicating a driving environment of the vehicle, determine a risk factor indicating a riskiness of a driving situation of the vehicle based on the first data, when the risk factor is between a first threshold value and a second threshold value, output information to a driver of the vehicle, when the risk factor is between the second threshold value and the third threshold value, output a warning to the driver of the vehicle, and when the risk factor is above the third threshold value, cause the vehicle to perform a driving action that reduces the riskiness of the driving situation.

In another embodiment, a method may include receiving first data indicating a driving environment of a vehicle, determining a risk factor indicating a riskiness of a driving situation of the vehicle based on the first data, when the risk factor is between a first threshold value and a second threshold value, outputting information to a driver of the vehicle, when the risk factor is between the second threshold value and a third threshold value, outputting a warning to the driver of the vehicle, and when the risk factor is above the third threshold value, causing the vehicle to perform a driving action that reduces the riskiness of the driving situation.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein are directed to a scope manager for advanced driving assistance systems. As discussed above, advanced driver assistance systems typically comprise a perception module, a planner module, and a control module. In embodiments disclosed herein, a vehicle system further includes a scope manager that determines a scope of operation for each of these modules.

In embodiments, a vehicle has an advanced driver assistance system (ADAS) that may perform one or more driving functions such as forward collision avoidance and/or adaptive cruise control. These ADAS functions may be employed while a driver performs manual driving but activates one or more ADAS functions. The vehicle system may then monitor the driving operation and environment of the vehicle and determine whether any ADAS functionality should be employed. In embodiments, a scope manager may determine a riskiness of a driving situation based on received sensor data, and instruct a planning module and a control module whether any ADAS intervention should be employed. The scope manager may also instruct a human machine interface (HMI) to display warnings to a driver and/or information about ADAS interventions. The scope manager may receive feedback from the driver and may modify the scope of operation of the planning module and the control module based on the received feedback, as disclosed herein.

Figure 1:
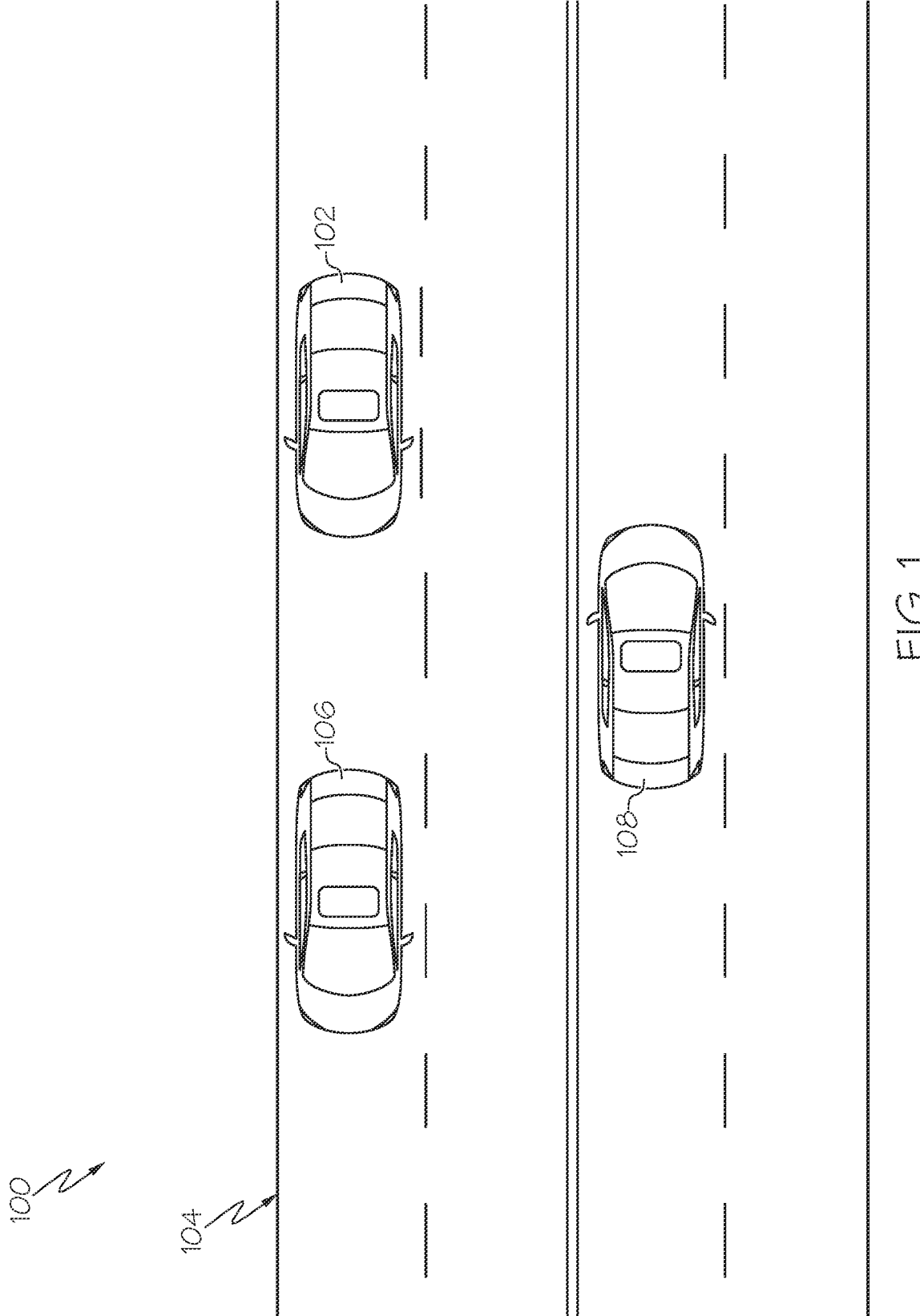
FIG. 1 schematically depicts a system for performing driving assistance, according to one or more embodiments shown and described herein.

Turning now to the figures, FIG. 1 depicts a system for performing driving assistance, as disclosed herein. In the example of FIG. 1, a system 100 includes an ego vehicle 102 driving along a road 104. In the example of FIG. 1, two other vehicles 106, 108 also drive along the road 104. However, in other examples, any number of other vehicles may drive along the road 104.

In the example of FIG. 1, the ego vehicle 102 may include one or more ADAS features. That is, the ego vehicle 102 may be driven manually by a human driver and may have one or more ADAS features such as forward collision avoidance or adaptive cruise control. In some examples, the driver of the ego vehicle 102 may turn certain ADAS features on or off as desired.

Figure 2:
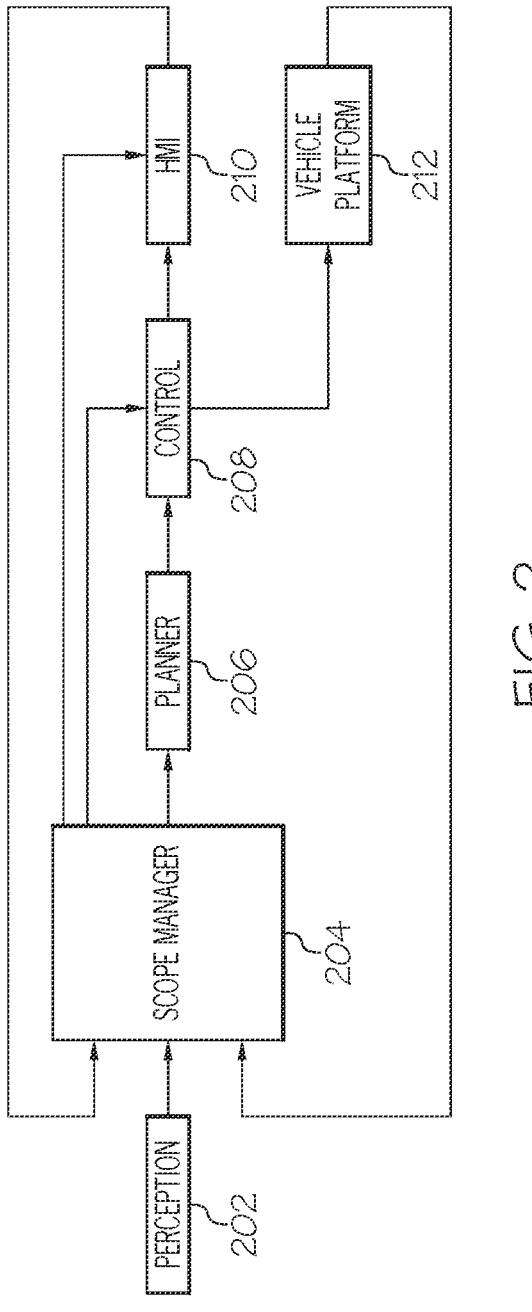
FIG. 2 depicts functional components of a vehicle system, according to one or more embodiments shown and described herein.

FIG. 2 depicts functional components of the ego vehicle 102. The functional components shown in FIG. 2 may be utilized when the ego vehicle 102 performs ADAS interventions. As discussed above, the ego vehicle 102 includes a perception module 202, which receives sensor data, a planner module 206, which determines a trajectory for the ego vehicle 102, and a control module 208, which determines vehicle controls to cause the ego vehicle 102 to follow the determined trajectory. The ego vehicle 102 also includes a vehicle platform 212, which comprises hardware components to implement the vehicle controls determined by the control module 208. The ego vehicle 102 also includes a human machine interface (HMI) 210, which outputs information to and receives information from a driver of the ego vehicle 102.

As shown in FIG. 2, the ego vehicle 102 also includes a scope manager 204. The scope manager 204 may determine a scope of operation from the planner module 206 and the control module 208, as disclosed herein. In particular, the scope manager 204 may receive an output from the perception module 202, which indicates information about a driving environment of the ego vehicle 102 (e.g., surrounding vehicles, pedestrians, traffic infrastructure, and the like). The scope manager 204 may then determine a riskiness of a driving situation based on the output of the perception module 202. Depending on the determined riskiness of the driving situation, the scope manager 204 may output an information message to the HMI 210, a warning to the HMI 210, or may cause the planner module 206 and the control module 208 to perform an intervention (e.g., to take a particular driving action).

The scope manager 204 may also receive information from the vehicle platform 212 indicating operational features of the ego vehicle 102 (e.g., a speed of the ego vehicle 102). The scope manager 204 may also receive feedback from the HMI 210 based on actions taken by the human driver. The scope manager 204 may modify a scope of operations or instructions sent to the planner module 206 and the control module 208 based on the received feedback, as disclosed in further detail below.

Figure 3:
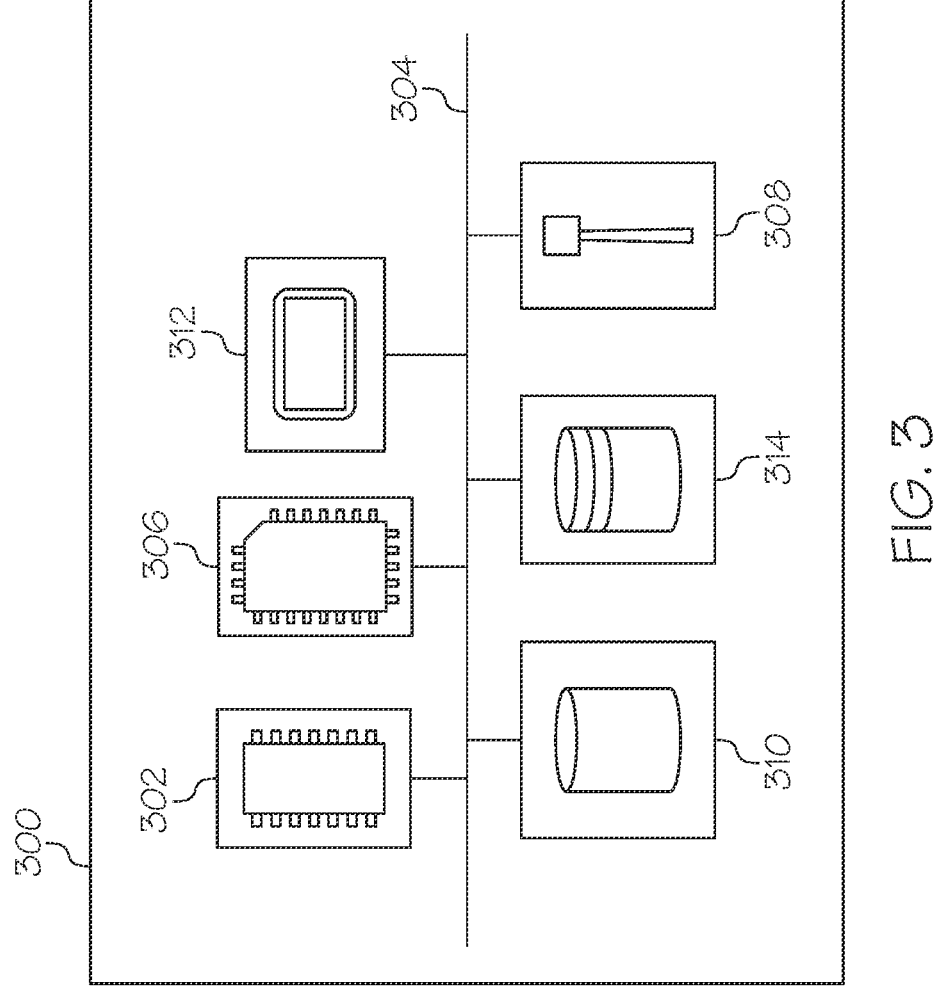
FIG. 3 schematically depicts a vehicle system, according to one or more embodiments shown and described herein.

FIG. 3 schematically depicts an example vehicle system 300 that may be included in the ego vehicle 102 of FIG. 1. In the example of FIG. 3, the vehicle system 300 includes one or more processors 302, a communication path 304, one or more memory modules 306, a satellite antenna 308, one or more vehicle sensors 310, a display 312, and a data storage component 314, the details of which will be set forth in the following paragraphs.

Each of the one or more processors 302 may be any device capable of executing machine readable and executable instructions. Accordingly, each of the one or more processors 302 may be a controller, an integrated circuit, a microchip, a computer, or any other computing device. The one or more processors 302 are coupled to a communication path 304 that provides signal interconnectivity between various modules of the vehicle system 300. Accordingly, the communication path 304 may communicatively couple any number of processors 302 with one another, and allow the modules coupled to the communication path 304 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 304 may be formed from any medium that is capable of transmitting a signal such as, for example, conductive wires, conductive traces, optical waveguides, or the like. In some embodiments, the communication path 304 may facilitate the transmission of wireless signals, such as Wi-Fi, Bluetooth®, Near Field Communication (NFC) and the like. Moreover, the communication path 304 may be formed from a combination of mediums capable of transmitting signals. In one embodiment, the communication path 304 comprises a combination of conductive traces, conductive wires, connectors, and buses that cooperate to permit the transmission of electrical data signals to components such as processors, memories, sensors, input devices, output devices, and communication devices. Accordingly, the communication path 304 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 300 includes one or more memory modules 306 coupled to the communication path 304. The one or more memory modules 306 may comprise RAM, ROM, flash memories, hard drives, or any device capable of storing machine readable and executable instructions such that the machine readable and executable instructions can be accessed by the one or more processors 302. The machine readable and executable instructions may comprise logic or algorithm(s) written in any programming language of any generation (e.g., 1 GL, 2 GL, 3 GL, 4 GL, or 5 GL) such as, for example, machine language that may be directly executed by the processor, or assembly language, object-oriented programming (OOP), scripting languages, microcode, etc., that may be compiled or assembled into machine readable and executable instructions and stored on the one or more memory modules 306. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 3, the vehicle system 300 comprises a satellite antenna 308 coupled to the communication path 304 such that the communication path 304 communicatively couples the satellite antenna 308 to other modules of the vehicle system 300. The satellite antenna 308 is configured to receive signals from global positioning system satellites. Specifically, in one embodiment, the satellite antenna 308 includes one or more conductive elements that interact with electromagnetic signals transmitted by global positioning system satellites. The received signal is transformed into a data signal indicative of the location (e.g., latitude and longitude) of the satellite antenna 308, and consequently, the vehicle containing the vehicle system 300.

The vehicle system 300 comprises one or more vehicle sensors 310, which may be part of the perception module 202. Each of the one or more vehicle sensors 310 is coupled to the communication path 304 and communicatively coupled to the one or more processors 302. The one or more vehicle sensors 310 may include, but are not limited to, LiDAR sensors, RADAR sensors, optical sensors (e.g., cameras, laser sensors), proximity sensors, location sensors (e.g., GPS modules), and the like. The vehicle sensors 310 may collect data that may be used to determine a driving environment and perform ADAS functions.

Still referring to FIG. 3, the vehicle system 300 comprises a display screen 312. In some examples, the display screen 312 may be part of an instrument panel or head unit inside of the ego vehicle 102. The display screen 312 may display information to the driver of the ego vehicle 102, as disclosed herein. In some examples, the display screen 312 may be a touch screen so that the driver can input information. The display screen 312 may function as the HMI 210 of FIG. 2.

Still referring to FIG. 3, the vehicle system 300 comprises a data storage component 314. The data storage component 314 may store data used by various components of the vehicle system 300. In addition, the data storage component 314 may store data collected by the vehicle sensors 310.

Figure 4:
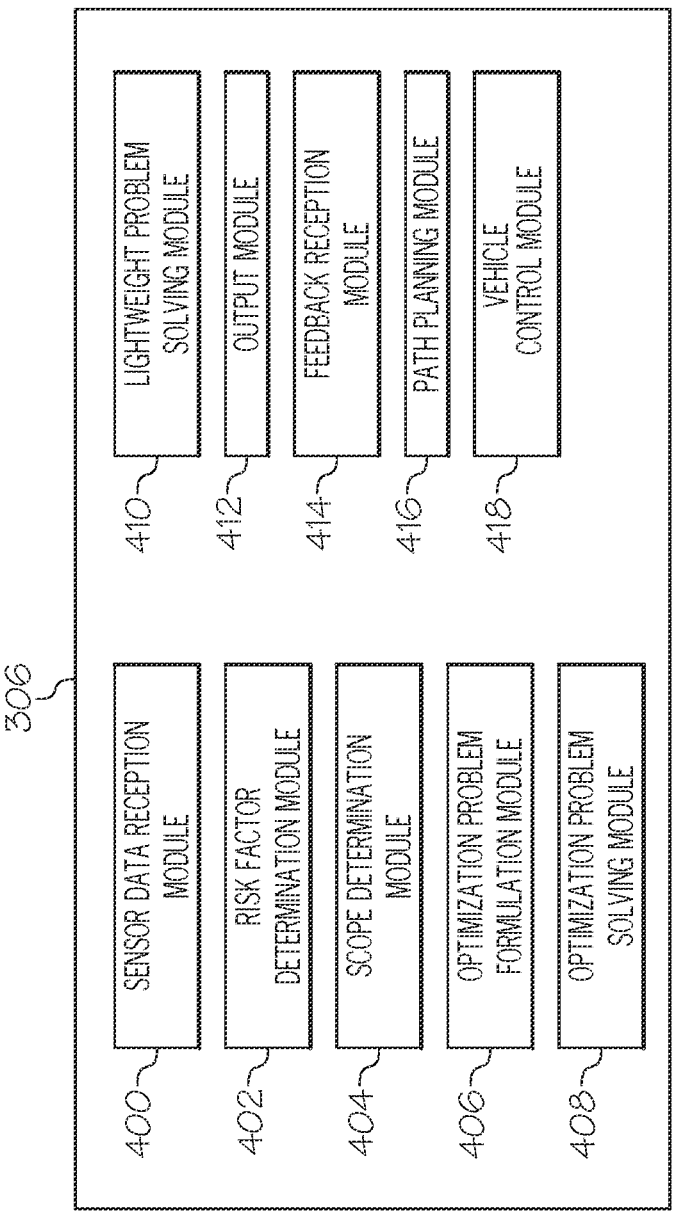
FIG. 4 schematically depicts memory modules of the vehicle system of FIG. 3, according to one or more embodiments shown and described herein.

Now referring to FIG. 4, the memory modules 306 of the vehicle system 300 are schematically shown. The one or more memory modules 306 include a sensor data reception module 400, a risk factor determination module 402, a scope determination module 404, an optimization problem formulation module 406, an optimization problem solving module 408, a lightweight problem solving module 410, an output module 412, a feedback reception module 414, a path planning module 416, and a vehicle control module 418. Each of the sensor data reception module 400, the risk factor determination module 402, the scope determination module 404, the optimization problem formulation module 406, the optimization problem solving module 408, the lightweight problem solving module 410, the output module 412, the feedback reception module 414, the path planning module 416, and the vehicle control module 418 may be a program module in the form of operating systems, application program modules, and other program modules stored in the one or more memory modules 306. In some embodiments, the program module may be stored in a remote storage device that may communicate with the vehicle system 300. Such a program module may include, but is not limited to, routines, subroutines, programs, objects, components, data structures and the like for performing specific tasks or executing specific data types as will be described below.

The sensor data reception module 400 may receive sensor data from the vehicle sensors 310. The sensor data received by the sensor data reception module 400 may indicate a driving environment of the ego vehicle 102. For example, the received sensor data may indicate positions, speeds, trajectories and other information about other road agents (e.g., vehicles and pedestrians). The received sensor data may also indicate positions and shapes of traffic infrastructure (e.g., shapes of roads, states of traffic lights, and the like). The received sensor data may also include other environmental data such as weather data, visibility information, and the like. The sensor data reception module 400 may also receive data about the ego vehicle 102 from the vehicle platform 212 (e.g., speed, acceleration, and the like). The information received by the sensor data reception module 400 may be used by the path planning module 416 to plan a trajectory for the ego vehicle 102, and may be used by the vehicle control module 418 to control the ego vehicle 102, as discussed in further detail below. In some examples, the sensor data reception module 400 may be part of the scope manager 204 of FIG. 2.

Referring still to FIG. 4, the risk factor determination module 402 more determine a risk factor indicating a riskiness of a driving situation of the ego vehicle 102, as disclosed herein. The risk factor may be based on a variety of factors such as an amount of vehicle traffic (e.g., a number of vehicles within a threshold distance of the ego vehicle 102), a speed of the ego vehicle 102, speeds of other vehicles around the ego vehicle 102, number of other vehicles passing the ego vehicle 102, the presence of vulnerable road users around the ego vehicle 102 (e.g., bicyclists and pedestrians), weather conditions, visibility, and the like. In some examples, the risk factor determination module 402 may use one or more trained models to predict vehicle behavior based on the received sensor data and determine a likelihood of collision between the ego vehicle 102 and another vehicle or an expected time to collision. In some examples, the risk factor may be based on a likelihood of collision or expected time to collision. For example, the longer an expected time to collision is, the lower the risk factor may be. In some examples, the risk factor determination module 402 may determine a risk factor having a value between 0 and 1. However, in other examples, the risk factor determination module 402 may determine a risk factor having any other value. In some examples, the risk factor determination module 402 may be part of the scope manager 204 of FIG. 2.

In some examples, the risk factor determination module 402 may determine the risk factor based on four components, $P_{fail}$, $P_{harm}$ $P_{perc}$, and $P_{cor}$. The value of $P_{fail}$ may represent a probability of an ADAS failing dangerously. The value of $P_{harm}$ may represent a probability that this failure causes harm. The value of $P_{perc}$ may represent a probability of the driver noticing the failure. The value of $P_{cor}$ may represent a probability of the driver correcting the failure. Accordingly, the risk factor determination module 402 may determine the risk factor based on overall probability of a harmful fault $P_{fault}$ based on the below equation.

$$P_{fault} = P_{fail} \times P_{harm}[1 - (P_{perc} \times P_{cor})]$$

However, it should be understood that in other examples, the risk factor determination module 402 may determine the risk factor using other techniques or other methods using these four quantities or other quantities.

The scope determination module 404 may determine a scope of operation for the planner module 206, the control module 208, and the HMI 210 based on the risk factor determined by the risk factor determination module 402. As discussed above, the ego vehicle 102 may be operated in manual driving mode and the driver may turn on one or more ADAS functionalities. Accordingly, after the risk factor determination module 402 determines a risk factor associated with a driving situation of the ego vehicle 102, the scope determination module 404 may determine whether the driver should be informed of a risky driving situation, warned of a risky driving situation, or whether an ADAS functionality should intervene and perform corrective driving action.

If the risk factor is low (e.g., below a first threshold value), the scope determination module 404 may determine that no action is necessary. In this instance, the scope determination module 404 may send signals to the planner module 206, the control module 208, and the HMI 210 indicating that no action should be taken. As such, when the risk factor is below the first threshold value, no ADAS functionality will be performed, and no warning will be presented to the driver.

If the risk factor is slightly elevated (e.g., above the first threshold value but below a second threshold value), the scope determination module 404 may determine that the driver of the ego vehicle 102 should be informed of the risky driving situation. In this instance, the scope determination module 404 may send signals to the planner module 206, the control module 208, and the HMI 210 indicating that the driver should be informed of the risky driving situation. This may cause the planner module 206 and the control module 208 to perform no ADAS intervention actions. However, the HMI 210 may inform the driver of the risky driving situation. For example, a message may be displayed on the display 312 indicating that a risky driving situation is occurring. In some examples, the display 312 may show a message indicating information about the risky driving situation. For example, the display 312 may show a message indicating that the ego vehicle 102 is getting too close to another vehicle or veering into another lane. By informing the driver of the risky situation, the driver may be able to perform corrective action without involving an ADAS intervention.

If the risk factor is moderately elevated (e.g., above the second threshold value but below a third threshold value), the scope determination module 404 may determine that the driver of the ego vehicle 102 should be warned of the driving situation. Warning the driver of the risky driving situation may cause a less subtle output than simply informing the driver of the risky driving situation. In this instance, the scope determination module 404 may send signals to the planner module 206, the control module 208, and the HMI 210 indicating that the driver should be warned of the risky driving situation. This may cause the planner module 206 and the control module 208 to perform no ADAS intervention actions. However, the HMI 210 may warn the driver of the risky driving situation. For example, the display 312 may brightly display a blinking warning message or the vehicle system 300 may output an audio warning that is more likely to get the driver's attention. In other examples, the HMI 210 may warn the driver by vibrating the steering wheel or performing another haptic function. By warning the driver, the driver may be able to perform corrective action without involving an ADAS intervention.

Finally, if the risk factor is highly elevated (e.g., above the third threshold value), the scope determination module 404 may determine that ADAS intervention is warranted. In this instance, the scope determination module 404 may send signals to the planner module 206, the control module 208, and the HMI 210 indicating that intervention should occur by performing a driving action. This may cause the vehicle system 300 to implement ADAS functionality to reduce the riskiness of the driving situation.

In some examples, in this situation, the vehicle system 300 may perform a particular ADAS functionality based on the driving situation. For example, if the ego vehicle 102 is close to colliding with another vehicle, the vehicle system 300 may perform collision avoidance. In another example, if the ego vehicle 102 is veering into another lane, the vehicle system 300 may perform lane keep assist. In other examples, other types of ADAS functionality may be performed based on a particular driving situation.

As discussed above, when a driving intervention is warranted, the scope determination module 404 may transmit a signal to the planner module 206 to determine a trajectory to reduce the riskiness of the driving situation (e.g., to avoid a collision). The planner module 206 may then determine an appropriate trajectory and transmit the trajectory to the control module 208. The control module 208 may then determine driving instructions (e.g., instructions for steering and acceleration of the vehicle) for following the determined trajectory. The control module 208 may then transmit the driving instructions to the vehicle platform 212, which may cause the ego vehicle 102 to implement the driving instructions.

In some examples, the scope determination module 404 may also transmit information to the HMI 210 indicating that driving intervention is being performed. The HMI 210 may receive a signal from the control module 208 indicating the specific driving intervention being performed. The HMI 210 may then out information to the driver indicating the driving intervention that is being performed. For example, the display 312 may display text or images indicating that driving intervention (e.g., the ADAS functionality) being performed. This may ensure that the driver is aware of the driving intervention that occurs.

Referring still to FIG. 4, the optimization problem formulation module 406 may be part of the scope manager 204, and may formulate an optimization problem to reduce the riskiness of the driving situation, as disclosed herein. As discussed above, the scope determination module 404 may determine when a driving intervention is warranted based on the risk factor determined by the risk factor determination module 402. As such, in some examples, the optimization problem formulation module 406 may formulate an optimization problem to avoid a collision or prevent the ego vehicle 102 from violating one or more driving rules as disclosed herein.

In some examples, the data storage component 314 may store certain driving rules to be followed. For example, the driving rules may include following traffic rules (e.g., not exceeding the speed limit, driving in the correct lane, obeying traffic lights), and avoiding collisions. The driving rules may also include constraints associated with passenger comfort (e.g., avoiding excessive acceleration or sudden turns).

The scope determination module 404 may determine whether the ego vehicle 102 is likely to violate one or more of the rules based on sensor data received by the sensor data reception module 400 (e.g., whether a collision is likely). If a rule is likely to be violated, the optimization problem formulation module 406 may formulate an optimization problem to avoid a rule violation. For example, if a collision is likely, the optimization problem formulation module 406 may determine an optimization problem comprising a goal (e.g., avoiding a collision), and a set of constraints (e.g., obeying traffic laws and maximizing passenger comfort). The scope determination module 404 may then transmit the formulated optimization problem to the planner module 206 to solve.

Referring still to FIG. 4, the optimization problem solving module 408 may be part of the planner module 206 and may solve the optimization problem formulated by the optimization problem formulation module 406. As such, in embodiments, the scope manager 204 may formulate an optimization problem and the planner module 206 may solve the optimization problem.

The optimization problem solving module 408 may utilize a variety of techniques to solve the optimization problem. In one example, the optimization problem solving module 408 may use quadratic programming to solve the optimization problem. However, in other examples, other techniques may be used. In embodiments, the optimization problem solving module 408 may solve the optimization problem by determine a trajectory that optimizes the goal (e.g., avoiding a collision), while satisfying the constraints. After solving the optimization problem, the determined trajectory may be transmitted from the planner module 206 to the control module 208.

Referring still to FIG. 4, the lightweight problem solving module 410 may be part of the scope manager 204 and may solve the optimization problem formulated by the optimization problem formulation module 406 in a more lightweight manner than the optimization problem solving module 408 of the planner module 206. In particular, the lightweight problem solving module 410 may solve the optimization problem in a manner that uses less computing resources than the optimization problem solving module 408. In one example, the lightweight problem solving module 410 may solve the optimization problem without certain constraints (e.g., constraints relating to passenger comfort).

For example, if the risk factor determination module 402 determines that the ego vehicle 102 is likely to collide with another vehicle, the optimization problem formulation module 406 may formulate an optimization problem of avoiding the collision. The optimization problem solving module 408 solve the optimization problem by determining a trajectory that involves decelerating the ego vehicle 102 with some non-linearly varying deceleration amount to maximize passenger comfort. However, it may take a non-trivial amount of time to determine this solution, which may not be fast enough to avoid the collision. Accordingly, the lightweight problem solving module 410 may determine a simpler solution of simply decelerating linearly to stop the ego vehicle 102 before the collision occurs. While this may be less comfortable for the vehicle passengers, this solution may use less computational resources and may be solved more quickly. As such, if the optimization problem solving module 408 is unable to solve the optimization problem quickly enough, the solution determined by the lightweight problem solving module 410 may be implemented.

Referring still to FIG. 4, the output module 412 may be part of the HMI 210 and may cause the display 312 to output information received from the scope manager 204 and/or the control module 208. For example, the output module 412 may cause the display 312 to display information about a risky driving situation, display a warning about a risky driving situation, or display information about a driving intervention being performed, as discussed above.

Referring still to FIG. 4, the feedback reception module 414 may be part of the HMI 210 and may receive feedback from the driver of the ego vehicle 102. In particular, if the scope manager 204 determines that a driving intervention is to be performed or has started to be performed, the driver may cancel the driving intervention, and such cancellation may be received by the feedback reception module 414. The feedback reception module 414 may transmit the feedback to the scope manager 204, which may modify the instructions to the planner module 206 and the control module 208 accordingly, as disclosed herein.

In one example, as discussed above, the display 312 may display a driving intervention to be performed by the vehicle system 300. In some examples, the driver may press a button or switch, or operate a touch screen to cancel the driving intervention. In this example, when the driver cancels the driving intervention, the feedback reception module 414 may transmit a signal indicating the cancellation to the scope manager 204. Upon receiving the cancellation signal, the scope determination module 404 may output a signal to the planner module 206 and the control module 208 to cancel the intervention. This may cause the driving intervention to be stopped, and full manual control of the ego vehicle 102 returned to the driver.

In another example, the driver may provide feedback by operating the ego vehicle 102 in a manner contradictory to the driving intervention. For example, if the driving intervention begins to decelerate the ego vehicle 102, the driver may step on the accelerator pedal of the ego vehicle 102, indicating a desire to accelerate. Since the driver desires to accelerate the vehicle, which is contradictory to deceleration caused by the driving intervention, the feedback reception module 414 may determine that the driver wishes to cancel or override the intervention. Similarly, if the driving intervention begins to turn the ego vehicle 102 one way, and the driver turns the steering wheel the other way, the feedback reception module 414 may determine that the driver wishes to cancel or override the intervention. If such a situation occurs, the feedback reception module 414 may transmit a signal to the scope manager 204 to cause the intervention to be cancelled, as discussed above.

Referring still to FIG. 4, the path planning module 416, which may be part of the planner module 206, may determine a trajectory for the ego vehicle 102 as part of an ADAS functionality. The trajectory may comprise modifications to a direction and/or speed or acceleration of the ego vehicle 102. For example, as discussed above, the path planning module 416 may determine a driving trajectory to reduce the riskiness of the driving situation or to implement a solution to the optimization problem solved by the optimization problem solving module 408.

Referring still to FIG. 4, the vehicle control module 418 may determine control signals to cause the ego vehicle 102 to implement the trajectory determined by the path planning module 416. As discussed above, the control signals determined by the vehicle control module 418 may be transmitted to the vehicle platform 212, which may implement the controls to cause the ego vehicle 102 to perform the specified driving action.

Figure 5:
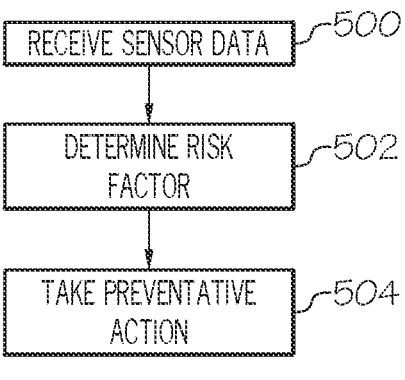
FIG. 5 depicts a flowchart of a method that may be performed by the vehicle system of FIG. 3, according to one or more embodiments shown and described herein.

FIG. 5 depicts a flowchart of an example method that may be performed by the vehicle system 300 of FIG. 3. At step 500, the sensor data reception module 400 may receive sensor data from the vehicle sensors 310. At step 502, the risk factor determination module 402 may determine a risk factor of the current driving situation based on the received sensor data. At step 504, the vehicle system 300 may take preventative action.

In particular, if the risk factor is between a first threshold level and a second threshold level, the scope determination module 404 may cause the output module 412 to display information about the driving situation on the display 312 (e.g., by outputting information such as a visual display). If the risk factor is between the second threshold level and a third threshold level, the scope determination module 404 may cause the output module 412 to warn the driver about the driving situation (e.g., by outputting a warning such as an audio warning). If the risk factor is greater than the third threshold level, then the scope determination module 404 may output a signal to cause the planner module 206 and the control module 208 to perform an intervention. For example, the optimization problem formulation module 406 may formulate an optimization problem to reduce the driving situation risk, and the optimization problem solving module 408 may solve the optimization problem. The path planning module 416 may then determine a vehicle trajectory based on the solution and the vehicle control module 418 may output control signals to cause the ego vehicle 102 to follow the determined trajectory.

It should now be understood that embodiments described herein are directed to a scope manager for advanced driver assistance systems. By providing a scope manager for advanced driver assistance systems, the scope manager can determine a riskiness of a driving situation and coordinate the actions of a planner module, a control module, and an HMI module. In particular, the scope manager can determine when it is appropriate to inform a driver about a risky driving situation, when it is appropriate to warn the driver about the risky driving situation, and when it is appropriate to intervene and for ADAS functionality to be implemented.

In addition, the scope manager can formulate an optimization problem associated with a driving situation and perform a lightweight solution while the planner module performs a more computationally extensive solution. As such, the control module can rely on the solution from the planner module is there is sufficient time, and rely on the lightweight solution of the scope manager if there is insufficient time for the planner module to formulate the solution. Furthermore, feedback can be received from the human driver to override any driving intervention, which can be coordinated by the scope manager to appropriately instruct the planner module and the control module.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle system of a vehicle comprising one or more processors configured to:
   receive first data indicating a driving environment of the vehicle;
   determine a risk factor indicating a riskiness of a driving situation of the vehicle based on the first data;
   when the risk factor is between a first threshold value and a second threshold value, output information to a driver of the vehicle;
   when the risk factor is between the second threshold value and a third threshold value, output a warning to the driver of the vehicle; and
   when the risk factor is above the third threshold value, cause the vehicle to perform a driving action that reduces the riskiness of the driving situation.

2. The vehicle system of claim 1, wherein the one or more processors are configured to cause a display to output information about the driving action.

3. The vehicle system of claim 1, wherein the one or more processors are configured to:
   after beginning to perform the driving action, receive feedback from the driver indicating that the driver does not agree with the driving action to be performed; and
   upon receiving the feedback, stop performing the driving action.

4. The vehicle system of claim 1, wherein the one or more processors are configured to:
   formulate an optimization problem to reduce the riskiness of the driving situation based on the first data and a set of constraints;
   determine a first solution to the optimization problem using a first algorithm; and
   determine the driving action based on the first solution.

5. The vehicle system of claim 4, wherein the one or more processors are configured to solve the optimization problem using quadratic programming.

6. The vehicle system of claim 4, wherein the one or more processors are configured to:
   determine a second solution to the optimization problem using a second algorithm, the second algorithm using less computational resources than the first algorithm; and

when the first solution to the optimization problem cannot be determined within a threshold period of time, determine a second driving action to reduce the riskiness of the driving situation based on the second solution, and cause the vehicle to perform the second driving action.

7. The vehicle system of claim 1, wherein:
   the information comprises visual information; and
   the warning comprises an audio warning.

8. The vehicle system of claim 1, wherein one of the information or the warning comprises vibrating a steering wheel of the vehicle.

9. The vehicle system of claim 1, wherein the risk factor is based at least in part on an expected time to collision.

10. A method comprising:
   receiving first data indicating a driving environment of a vehicle;
   determining a risk factor indicating a riskiness of a driving situation of the vehicle based on the first data;
   when the risk factor is between a first threshold value and a second threshold value, outputting information to a driver of the vehicle;
   when the risk factor is between the second threshold value and a third threshold value, outputting a warning to the driver of the vehicle; and
   when the risk factor is above the third threshold value, causing the vehicle to perform a driving action that reduces the riskiness of the driving situation.

11. The method of claim 10, further comprising causing a display to output information about the driving action.

12. The method of claim 10, further comprising:
   after beginning to perform the driving action, receiving feedback from the driver indicating that the driver does not with the driving action to be performed; and
   upon receiving the feedback, stopping the performance of the driving action.

13. The method of claim 10, further comprising:
   formulating an optimization problem to reduce the riskiness of the driving situation based on the first data and a set of constraints;
   determining a first solution to the optimization problem using a first algorithm; and
   determining the driving action based on the first solution.

14. The method of claim 13, further comprising solving the optimization problem using quadratic programming.

15. The method of claim 13, further comprising:
   determining a second solution to the optimization problem using a second algorithm, the second algorithm using less computational resources than the first algorithm; and
   when the first solution to the optimization problem cannot be determined within a threshold period of time, determining a second driving action to reduce the riskiness of the driving situation based on the second solution, and cause the vehicle to perform the second driving action.

16. The method of claim 10, wherein:
   the information comprises visual information; and
   the warning comprises an audio warning.

17. The method claim 10, wherein one of the information or the warning comprises vibrating a steering wheel of the vehicle.

18. The method of claim 10, wherein the risk factor is based at least in part on an expected time to collision.

* * * * *